Oct. 28, 1958   C. A. BLOMSTRAN ET AL   2,858,097
VALVE ACTUATING MECHANISM
Filed April 6, 1954   4 Sheets-Sheet 1
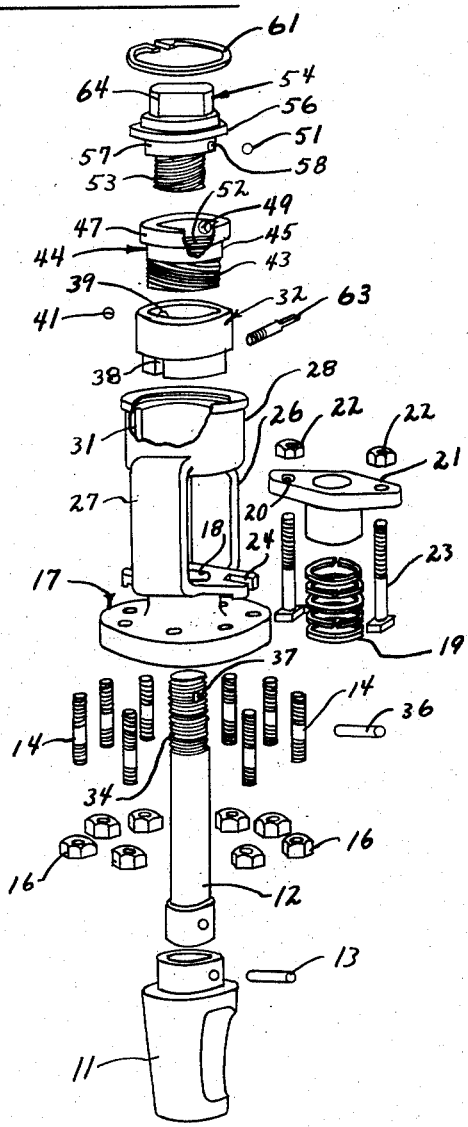
Fig. 1
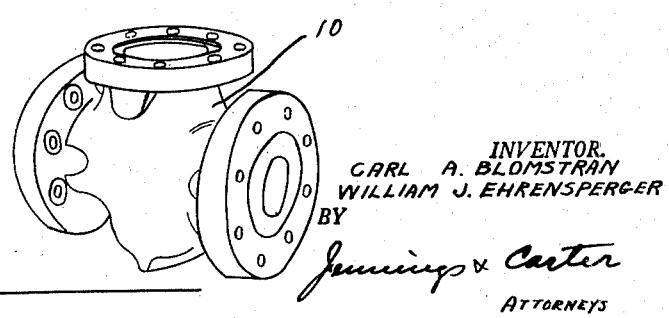
INVENTOR.
CARL A. BLOMSTRAN
WILLIAM J. EHRENSPERGER
BY
ATTORNEYS

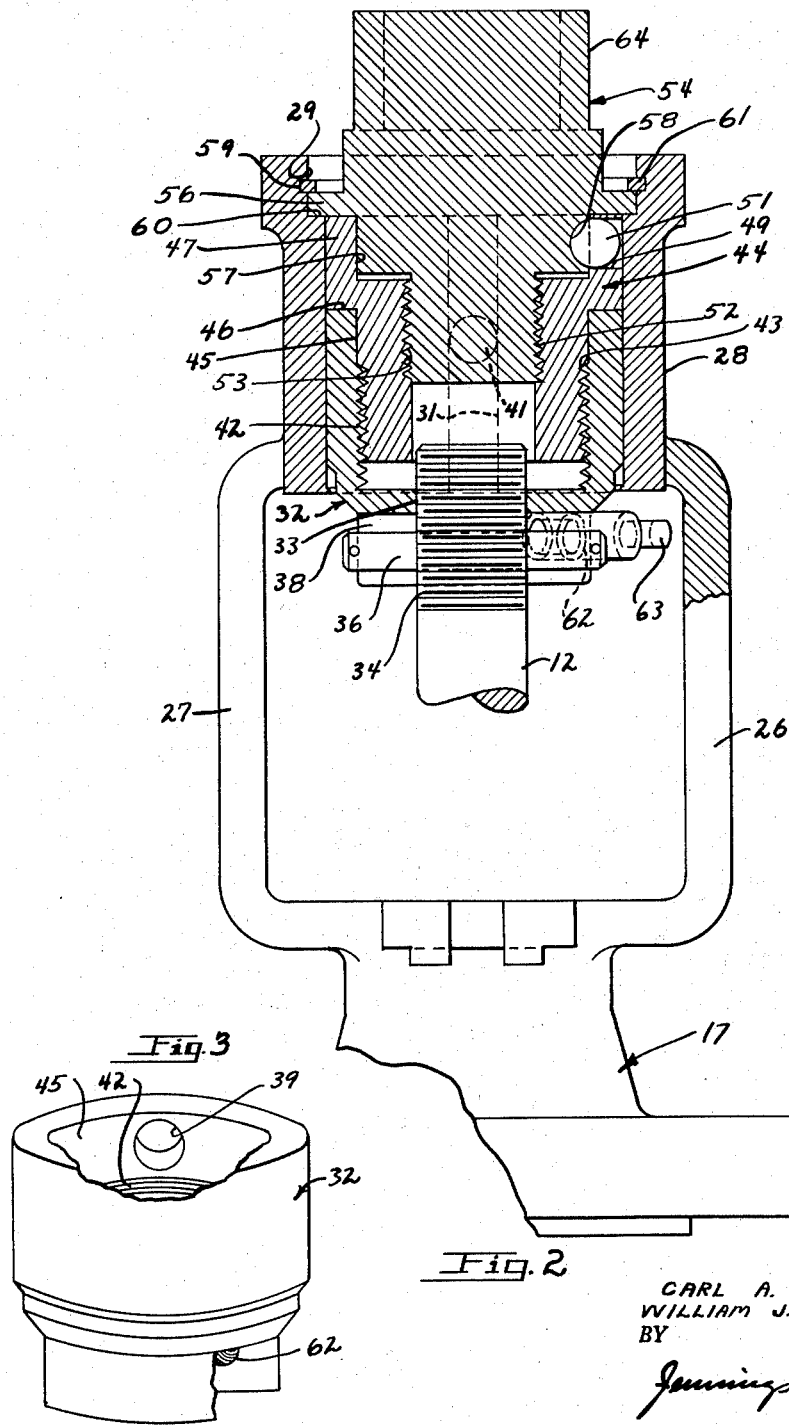

Oct. 28, 1958    C. A. BLOMSTRAN ET AL    2,858,097
VALVE ACTUATING MECHANISM
Filed April 6, 1954      4 Sheets-Sheet 3
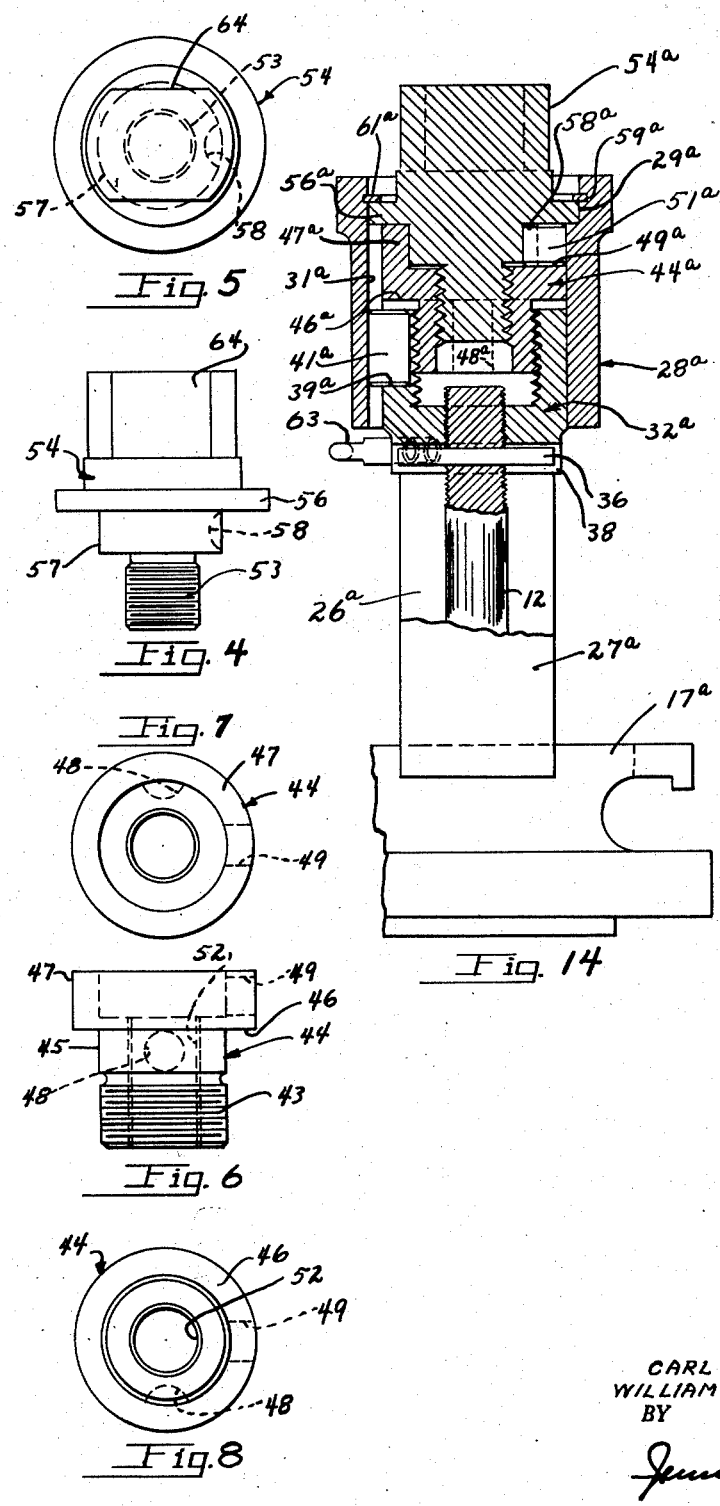
INVENTOR.
CARL A. BLOMSTRAN
WILLIAM J. EHRENSPERGER
BY
ATTORNEYS Oct. 28, 1958

C. A. BLOMSTRAN ET AL 2,858,097

VALVE ACTUATING MECHANISM

Filed April 6, 1954

INVENTOR.
CARL A. BLOMSTRAN
WILLIAM J. EHRENSPERGER
BY

Jennings & Carter
ATTORNEYS ited States Patent Office 2,858,097
Patented Oct. 28, 1958

2,858,097

VALVE ACTUATING MECHANISM

Carl A. Blomstran and William J. Ehrensperger, Birmingham, Ala., assignors to Stockham Valves & Fittings, Inc., a corporation of Delaware Application April 6, 1954, Serial No. 421,246

7 Claims. (Cl. 251—164)

This invention relates to a valve and more particularly to mechanism for actuating a plug type valve and has for a prime object the provision of such mechanism which holds the plug against rotation as it is moved to and from seated position, thus preventing rotation of the plug against its seat.

Another object of our invention is to provide valve actuating mechanism embodying an inner rotatable member secured rigidly to the valve stem, an intermediate rotatable member in threaded connection with the inner member and an outer rotatable member in oppositely threaded connection with the intermediate member, together with means associated with the rotatable members holding the inner member against rotation during movement of the valve stem to and from seated position.

A further object of our invention is to provide valve actuating mechanism of the character designated which shall be simple of construction, economical of manufacture and which requires a minimum of maintenance to keep the same in satisfactory working order.

Apparatus embodying features of our invention is shown in the accompanying drawings, forming a part of this application in which:

Fig. 1 is an exploded view showing our improved valve actuating mechanism associated with a conventional type plug valve;

Fig. 2 is a side elevational view showing our improved valve actuating mechanism in section;

Fig. 3 is a perspective view, partly broken away, of the innermost part of the valve actuating mechanism;

Fig. 4 is a side elevational view of the outer rotatable part of the valve actuating mechanism;

Fig. 5 is a top plan view of the part shown in Fig. 4;

Fig. 6 is a side elevational view showing the intermediate part of the valve operating mechanism;

Fig. 7 is a top plan view of the part shown in Fig. 6;

Fig. 8 is a bottom plan view of the part shown in Fig. 6;

Fig. 14 is a side elevational view, partly broken away and in section, showing a modified form of valve actuating mechanism.

Figure 10:
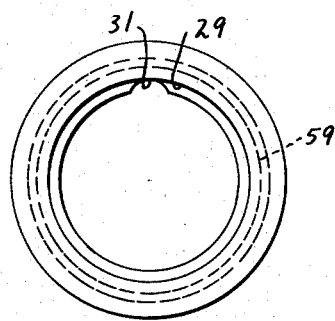
Fig. 10 is a top plan view of the sleeve portion of the yoke.

Referring now to the drawings for a better understanding of our invention we show a conventional type of valve body 10 having a plug member 11 connected to the lower end of a valve stem 12 by means of a pin 13. Secured to the body 10 by means of studs 14 and nuts 16 is the inner end of a yoke member 17 having an opening 18 therein for receiving the valve stem 12. Suitable packing rings 19 surround the valve stem 12 and are held in place by means of a gland follower 21. The gland follower 21 is attached to the yoke 17 by means of nuts 22 and bolt 23 which pass through openings 20 in the gland follower and engage suitable lugs 24 on the yoke. The yoke 17 is provided with outwardly extending spaced side members 26 and 27 which are connected adjacent their outer ends to a sleeve member 28. An enlarged diameter portion 29 is provided adjacent the outer end of the sleeve member 28 and an axially extending groove 31, substantially semi-circular as viewed in cross section, is provided along the inner wall of the sleeve member for purposes to be set forth hereinafter.

Mounted for rotation within the inner end of the sleeve member 28 is a cylindrical cup shaped member 32 having a threaded opening 33 in the bottom thereof for receiving the outer threaded end 34 of the valve stem 12. The inner member 32 is held against rotation relative to the valve stem 12 by means of a pin 36 which passes through an opening 37 in the outer end of the valve stem 12 and engages a recess 38 in the bottom of the rotatable member 32. A substantially round opening 39 is provided in the side wall of the cup shaped rotatable member 32 for receiving an index member 41 which is preferably in the form of a steel ball.

The inner wall of the cup shaped rotatable member 32 is provided with left-hand threads 42 for receiving external threads 43 along the lower portion of an intermediate rotatable member 44. The intermediate member 44 is provided with an unthreaded intermediate portion 45 and an outer portion which is enlarged as at 46 and terminates in an outwardly and axially extending annular flange 47. A substanially semi-spherical recess 48 is provided in the outer surface of the intermediate member 44 in position to receive a portion of the index member 41. The annular flange 47 of the intermediate member 44 is provided with a substantially round opening 49 for receiving an index member 51 which may also be in the form of a steel ball. As shown in Figs. 7 and 8, the opening 49 is positioned at substantially right angles to the recess 48. The intermediate member 44 is provided with a centrally disposed opening 52 which is provided with right hand threads for receiving an externally threaded portion 53 of an outer rotatable member 54. The outer member 54 is provided with a radially extending annular flange 56 which engages the outer edge of the flange 47 on the intermediate member 44 when the outer member is screwed into the intermediate member, as shown in Fig. 2. The outer member 54 is also provided with a portion 57 which slidably engages the inner surface of the annular flange 47 on the intermediate member 44. A substantially semi-spherical recess 58 is provided in the outer surface of the portion 57 in position to receive a portion of the index member 51.

The sleeve member 28 is provided with an annular groove 59 adjacent the outer end thereof for receiving a retaining ring 61 which bears against the outer surface of the annular flange 56, thus securing and preventing outward movement of the outer rotatable member 54. As shown in Fig. 2, the annular flange 56 is held against movement inwardly of the sleeve due to the fact that it rotates in the enlarged diameter portion of the sleeve and bears against a shoulder 60 formed therein.

A radially extending opening 62 is provided in the lower portion of the inner rotatable member 32 for receiving a stop pin 63. As shown in Fig. 2, the stop pin 63 projects outwardly of the side members 26 and 27 of the yoke, whereby it engages the side members to limit rotation of the inner member 32 in both directions. Also, as shown in Figs. 1 to 4, the outer end of the rotatable member 54 is provided with a suitable head 64 for receiving a suitable handle or wrench.

From the foregoing description the operation or our improved valve actuating mechanism will be readily understood. To move the valve to open position from the closed seated position the outer rotatable member 54 is turned in a counter-clockwise direction. At this time the index member 51 is in the recess 58, thus preventing relative rotation between the members 44 and 54. The index member 51 is held in this position by the inside diameter of the sleeve member 28. Also, at this time the index member 41 is in the axially extending recess 31 thus preventing rotation of the member 32. The index member 41 is held in the lower portion of the recess 31 by the unthreaded portion 45 along the outer surface of member 44. The left hand threads between the parts 32 and 44 permit member 44 to screw into part 32, thereby moving the member 32 axially in the sleeve member, whereby the plug 11 is moved outwardly of the valve seat without rotation. Counter-clockwise rotation is continued until the shoulder 46 of the intermediate member 44 engages the rotatable member 32, as shown in Fig. 2. The recess 48 is so positioned on the intermediate member 44 that when the members 32 and 44 are shouldered it is in register with the axially extending recess 31 and the index member 41, thus permitting the index member 41 to move into the recess 48. The rotatable members 54, 44, and 32 are thus locked together by the index members being held in their respective positions by the inside diameter of sleeve 28 and are free to rotate as a unit until the plug 11 is moved to open position. The pin 63 is so positioned on the rotatable member 32 that it engages the outwardly extending side member 27 of the yoke when the valve reaches open position. As the stop pin 63 engages the side member 27 of the yoke, the recess 58 in the outer rotatable member 54 is in register with the axially extending recess 31, thus permitting the index member 51 to enter the upper portion of the recess 31 and thereby prevent further rotation of the intermediate member 44. The index member 51 is held in this position by the portion 57 of the outer member 54. Since the outer rotatable member 54 is held against axial movement relative to the sleeve member 28 and right hand threads are employed between the intermediate member 44 and the outer member 54, continued counter-clockwise rotation of the outer member 54 causes the intermediate member 44 together with the inner member 32 to move axially toward the valve seat without further rotation, thus forcing the valve stem 12 and plug 11 into seated position.

To close the valve from open seated position, the outer member 54 is rotated in a clockwise direction causing the same to screw into the intermediate member 44 thereby moving the intermediate member 44 and the inner rotatable member 32 together with the valve stem 12 and the plug 11 axially from the valve seat.

The inner rotatable member 32 and the intermediate member 44 are held against rotation by the index member 51 which is now within the axially extending recess 31. Clockwise rotation is continued until the rotatable members 54 and 44 are shouldered. At this time the recess 58 in the member 54 is in register with the recess 31 and thus receives the index member 51. After the index member 51 leaves the recess 31, the rotatable members 54, 44 and 32 are locked together by the index members 41 and 51 and are free to rotate as a unit until the plug 11 is moved to closed position. As the plug reaches closed position, the stop pin 63 engages the side member 26 of the yoke and the index member 41 moves into register with the axially extending recess 31, thereby holding the inner member 32 against further rotation and permitting relative rotation between the intermediate member 44 and the inner member 32. Continued clockwise rotation of the outer member 54 rotates the intermediate member thus causing the inner member 32 to move axially in the sleeve member 28, thereby moving the plug 11 to seated position without rotation.

Referring now to Fig. 14 of the drawing, we show a modified form of valve actuating mechanism comprising a yoke member 17a having outwardly extending side members 26a and 27a. Connected to the outer ends of the side members 26a and 27a is a sleeve member 28a having an enlarged diameter portion 29a adjacent the outer end thereof. Connected to the outer end of the valve stem 12 by means of the pin 36 is an inner cylindrical cup-shaped member 32a which is disposed to rotate within the sleeve member 28a. Connected to the inner member 32a by means of left-hand threads is an intermediate rotatable member 44a. The upper end of the intermediate member is enlarged as at 46a and terminates in an outwardly extending annular flange 47a. Connected to the intermediate member 44a by means of right hand threads is an outer rotatable member 54a having an annular flange 56a which is disposed to engage the enlarged diameter portion 29a, as shown. An annular groove 59a is provided in the enlarged diameter portion 29a for receiving a retaining ring 61a which prevents outward movement of the rotatable member 54a.

An axially extending slot 39a is provided in the inner member 32a for receiving an index member 41a which is in the form of a roller. A recess 48a, substantially semi-circular as viewed in cross section, is provided in the intermediate rotatable member 44a in position to receive the index member 41a when the intermediate member and the inner member 32a shoulder. An axially extending slot 49a is provided in the annular flange 47a for receiving an index member 51a which is also in the form of a roller. A recess 58a substantially semi-circular as viewed in cross section is provided in the outer member 54a in position to receive a portion of the index member 51a. An axially extending recess 31a is provided in the sleeve member 28a for receiving the index members 41a and 51a in substantially the same manner as the recess 31 receives the index members 41 and 51.

Figure 12:
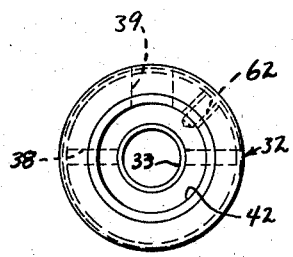
Fig. 12 is a top plan view of the part shown in Fig. 11.
Figure 9:
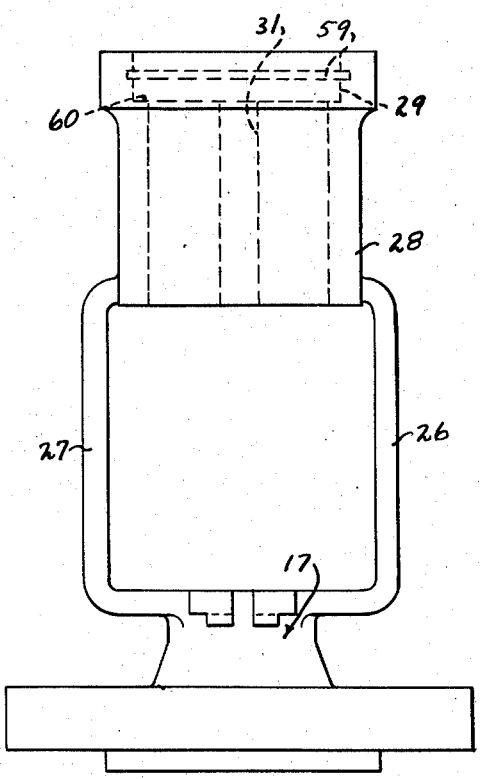
Fig. 9 is a side elevational view of the yoke member.
Figure 11:
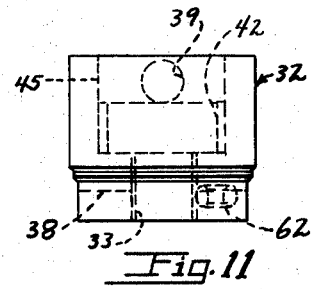
Fig. 11 is a side elevational view of the inner rotatable part of the valve actuating mechanism.
Figure 13:
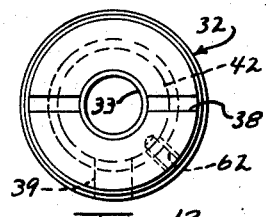
Fig. 13 is a bottom plan view of the part shown in Fig. 11.

The operation and construction of our valve actuating mechanism shown in Fig. 14 is substantially the same as that shown in Figs. 1 to 13. The principal difference being that rollers are employed as index members rather than steel balls.

From the foregoing it will be seen that we have devised an improved valve actuating mechanism which is fully effective to move the valve plug to and from seated position without rotating the same against its seat. By providing an inner rotatable member in threaded connection with an intermediate rotatable member and an outer rotatable member in oppositely threaded connection with the intermediate member, together with means preventing rotation of the inner rotatable member as the valve stem is moved to and from seated position, our valve actuating mechanism is very simple of construction and readily lends itself to mass production. Furthermore, by providing index members in the form of steel balls or rollers, we have provided a substantially trouble free valve which requires a minimum amount of maintenance. We have found, in actual practice, that our improved valve actuating mechanism is satisfactory in every respect for accomplishing its intended purpose.

While we have shown our invention in but two forms, it will be obvious to those skilled in the art that it is not so limited but is susceptible of various other changes and modifications without departing from the spirit thereof, and we desire, therefore, that only such limitations shall be placed thereupon, as are specifically set forth in the appended claims.

What we claim is:

1. In mechanism for actuating a valve having a body and a plug in which the plug is adapted to unseat, turn and reseat, a sleeve adapted to be rigidly connected to the valve body, an inner rotatable member in slidable contact with the inner surface of said sleeve and adapted to be rigidly connected to the plug, an intermediate rotatable member in slidable contact with the inner surface of said sleeve and in threaded connection with said inner member, an outer rotatable member in slidable contact with said sleeve and in oppositely threaded connection with said intermediate rotatable member from the threaded connection between said intermediate rotatable member and said inner rotatable member, a first locking member operatively connected to said inner rotatable member and adapted to engage said sleeve at a selected angular position of said inner rotatable member relative to said sleeve to lock said inner rotatable member and said sleeve against relative rotation and permit rotation of the intermediate rotatable member relative to said inner member and adapted to engage said intermediate rotatable member when released from said sleeve to permit relative rotation between said sleeve and said inner member and locking said inner member and said intermediate rotatable member against relative rotation, a second locking member operatively connected to said intermediate rotatable member and adapted to engage said sleeve at a selected angular position of said intermediate rotatable member relative to said sleeve to lock said intermediate rotatable member and said sleeve against relative rotation and permit rotation of the outer rotatable member relative to said intermediate rotatable member and adapted to engage said outer rotatable member when released from said sleeve to permit relative rotation between said sleeve and said intermediate rotatable member and locking said outer rotatable member and said intermediate rotatable member against relative rotation, means releasing said first locking member from said sleeve at a selected angular position of said intermediate rotatable member relative to said inner member, whereby the intermediate rotatable member is locked to the inner rotatable member to permit the inner, intermediate and outer rotatable members to rotate as a unit while said first and second locking members are both released from the sleeve, means releasing said second locking member from said sleeve at a selected angular position of said outer rotatable member relative to said intermediate rotatable member whereby the outer rotatable member is locked to said intermediate rotatable member to permit the inner, intermediate and outer rotatable members to rotate as a unit while said second and first locking members are both released from the sleeve, means holding said outer rotatable member against axial movement relative to said sleeve, and means limiting rotation of said inner rotatable member.

2. In mechanism for actuating a valve having a body and a plug in which the plug is adapted to unseat, turn and reseat, a sleeve adapted to be rigidly connected to the valve body and having at least one axially extending recess therein, an inner rotatable member in slidable contact with the inner surface of said sleeve and adapted to be rigidly connected to the plug, an intermediate rotatable member in slidable contact with the inner surface of said sleeve in threaded connection with said inner rotatable member, an outer rotatable member in slidable contact with said sleeve in oppositely threaded connection with said intermediate rotatable member from the threaded connection between said intermediate rotatable member and said inner rotatable member, said inner and intermediate rotatable members having openings therethrough, a first index member within said opening in said inner rotatable member, a second index member within said opening in said intermediate rotatable member, said first and second index members being disposed to enter said axially extending recess in the sleeve when they are in register with the same to lock the inner rotatable member and the sleeve against relative rotation and permit rotation of the intermediate rotatable member relative to said inner member while said first index member is in said axially extending recess and to lock the intermediate rotatable member and said sleeve against relative rotation and permit rotation of the outer rotatable member relative to said intermediate rotatable member while said second index member is in said axially extending recess, the intermediate and outer rotatable members having recesses therein disposed to be in register with and receive said first and second index members respectively at selected angular positions of said intermediate and outer rotatable members relative to said inner and intermediate rotatable members respectively, whereby said index members are removed from said axially extending recess to cause the inner, intermediate and outer rotatable members to rotate as a unit while both of said index members are thus removed from the axially extending recess, means holding said outer rotatable member against axial movement relative to the sleeve, and means limiting rotation of said inner rotatable member.

3. Mechanism as defined in claim 2 in which a stop member is mounted on said inner rotatable member in position to engage a stationary member to limit rotation of said inner rotatable member.

4. In mechanism for actuating a valve having a body and a plug in which the plug is adapted to unseat, turn and reseat, a sleeve adapted to be rigidly connected to the valve body, an inner cup shaped member in slidable contact with the inner surface of said sleeve and adapted to be rigidly connected to the plug, said inner member having an opening in the wall thereof, a first index member disposed to fit in said opening in the inner member, an intermediate rotatable member having an externally threaded inner end fitting within and in threaded connection with said inner member, said intermediate member having a recess therein disposed to receive a portion of said first index member at a selected angular position of said intermediate member relative to said inner member whereby said intermediate and inner rotatable members are then locked together, an axially extending annular flange at the outer end of said intermediate member in slidable contact with the inner surface of said sleeve, said annular flange having an opening therethrough, a second index member disposed to fit in the opening in said flange, an outer rotatable member fitting within said annular flange of the intermediate member in oppositely threaded connection with said intermediate member from that of said inner member, said outer member having a recess therein disposed to receive a portion of said second index member at a selected angular position of said outer member relative to said intermediate member whereby said intermediate and outer rotatable members are then locked together, said sleeve having at least one axially extending recess therein positioned to receive a portion of said index members when they are in register with the same, whereby said first and second index members leave their associated recess in the intermediate and outer rotatable members respectively to lock the inner rotatable member and said sleeve against relative rotation and permit rotation of the intermediate rotatable member relative to said inner member while said first index member is in said axially extending recess and to lock the intermediate rotatable member and said sleeve against relative rotation and permit rotation of the outer rotatable member relative to said intermediate member while said second index member is in said axially extending recess, means holding said outer rotatable member against axial movement relative to said sleeve, and means limiting rotation of said inner rotatable member.

5. Mechanism as defined in claim 4 in which the index members are in the form of rollers.

6. Mechanism as defined in claim 4 in which the index members are in the form of balls.

7. Mechanism as defined in claim 4 in which the means holding the outer rotatable member against axial movement of the sleeve comprises an enlarged diameter portion at the outer end of the sleeve, an annular radially extending flange on the outer rotatable member fitting within said enlarged diameter portion, and a retaining ring engaging said enlarged diameter portion outwardly of said flange.

References Cited in the file of this patent

UNITED STATES PATENTS

| | | |
|---|---|---|
| 711,216 | Keyes | Oct. 14, 1902 |
| 1,848,369 | Mohr | Mar. 8, 1932 |
| 1,864,596 | Jones | June 28, 1932 |
| 2,076,838 | Heggem | Apr. 13, 1937 |
| 2,139,632 | Flodin | Dec. 6, 1938 |
| 2,238,385 | Foster | Apr. 15, 1941 |
| 2,408,223 | Nash | Sept. 24, 1946 |
| 2,501,150 | Anderson | Mar. 21, 1950 |